May 5, 1959      N. B. WILLIAMSON      2,885,215
GOLF CART
Filed Oct. 28, 1957      2 Sheets-Sheet 1
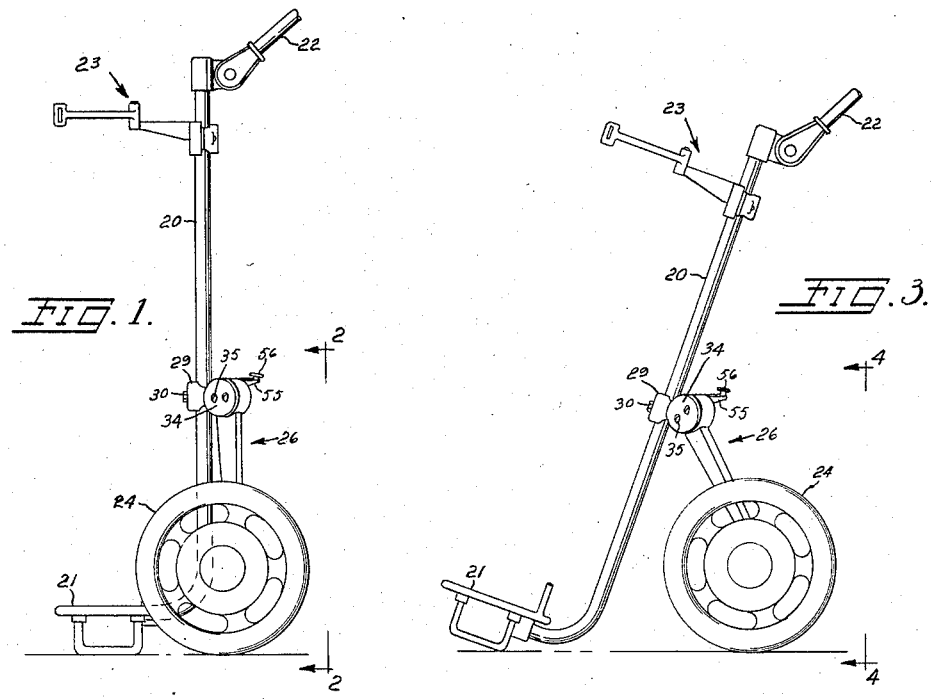
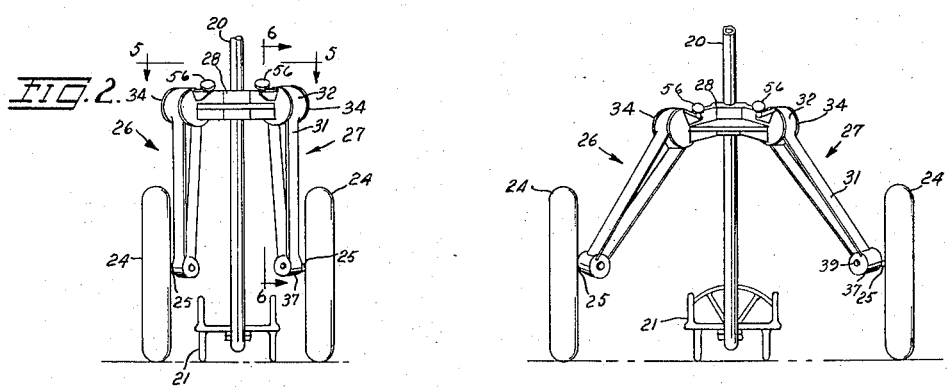
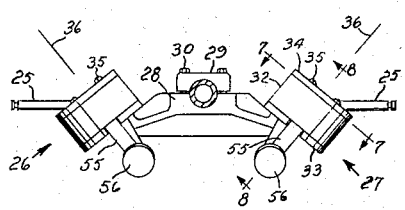
INVENTOR
Norman B. Williamson
BY
AGENT May 5, 1959 — N. B. WILLIAMSON — 2,885,215
GOLF CART
Filed Oct. 28, 1957 — 2 Sheets-Sheet 2
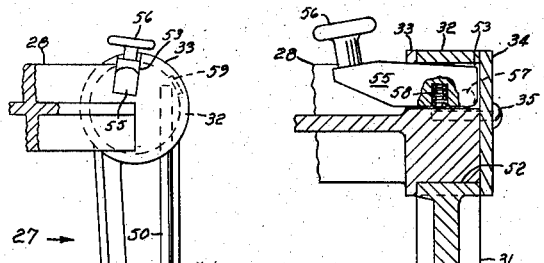
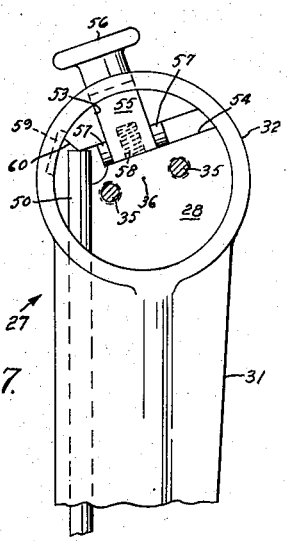
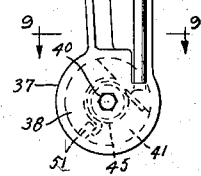
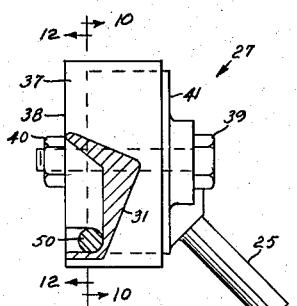
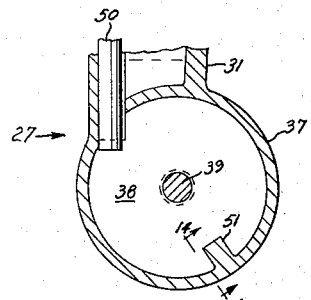
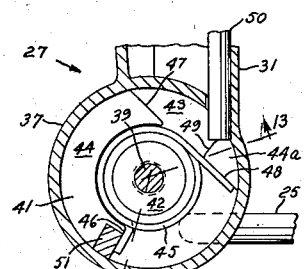
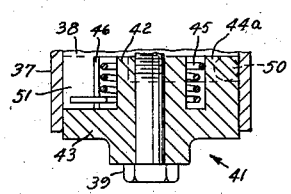
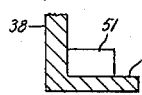
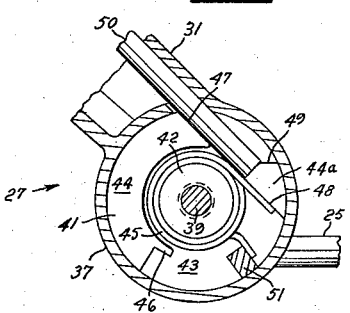
INVENTOR
Norman B. Williamson.
BY
AGENT United States Patent Office 2,885,215
Patented May 5, 1959

2,885,215
GOLF CART

Norman B. Williamson, Portland, Oreg., assignor to Jarman-Williamson Company, Portland, Oreg.

Application October 28, 1957, Serial No. 692,617

8 Claims. (Cl. 280—42)

This invention relates generally to carts for transporting bags of golf clubs during the play of golf and more particularly to a two wheeled golf club cart having folding arms by which the wheels are independently attached to the frame of the cart.

Specifically this invention provides a new and useful form of parallel motion mechanism for each of the two wheel supporting arms of a golf cart whereby the wheels may be positioned with respect to the base of the cart frame in either a short sided triangular position for storing the cart with the golf bag in an upright position or in a long sided triangular position to give greater stability to the cart when in use transporting the cart over the playing ground.

It is the primary object of this invention to provide a wheel supporting arm mechanism for a golf cart in which the mechanism provides freedom of parallel motion of a cart supporting wheel between two positions of the wheel parallel to the vertical fore and aft center plane of the cart, one position of the wheel being closer to the center plane than the other position and farther from the top of the cart than the other position, whereby the one position will be a position of storage of the cart while holding a golf bag in an upright position and the other position will be a position for supporting the cart while holding said golf bag in a rearwardly inclined position for transport during the play of golf.

It is a second object to provide such a mechanism which is spring biased towards the one position.

It is a third object to provide such a wheel supporting mechanism with a parallel motion structure of two short links of equal effective length and two long links of equal effective length, one end of each of the short links being permanently linked with a respective end of one of the long links and the other end of each of the short links being resiliently biased towards the respective ends of the other of the long links to maintain the other of the long links in compression at all times.

It is a fourth object to provide such a mechanism in which there is no latch mechanism required to aid the biasing means to give the wheel sufficient restraint to maintain the wheel in the one position.

It is a fifth object to provide such a mechanism in which the wheel can be easily pushed from the one position to the other position and to provide a latch means to latch the wheel in the other position.

It is a sixth object to provide such a latch which can be released conveniently to allow gravity and said biasing means to return the wheel to the one position.

It is a seventh object to provide such a mechanism which is clean in design, pleasing in appearance, readily adapted to die casting of its principal parts, low in first cost, trouble free and unique in its arrangement of parts.

How these and other objects are attained is explained in the following description referring to the attached drawings in which Fig. 1 is a view in side elevation of the golf cart of this invention with the wheel arm mechanism collapsed to the storage position of the cart.

Fig. 2 is a fragmental rear view of the cart as viewed from the line 2—2 of Fig. 1.

Fig. 3 is a view in side elevation of the cart with the wheel arm mechanism expanded to show the cart as used on the playing field.

Fig. 4 is a fragmental rear view of the cart as viewed from the line 4—4 of Fig. 3.

Fig. 5 is an enlarged fragmental view as seen from line 5—5 of Fig. 2.

Fig. 6 is an enlarged fragmental view as seen from line 6—6 of Fig. 2.

Fig. 7 is an enlarged fragmental view as seen from line 7—7 of Fig. 5.

Fig. 8 is an enlarged fragmental view in partial section as seen from line 8—8 of Fig. 5.

Fig. 9 is an enlarged fragmental view in partial section as seen from line 9—9 of Fig. 6.

Fig. 10 is a fragmental view in partial section as seen from line 10—10 of Fig. 9.

Fig. 11 is a view similar to Fig. 10 but with the wheel arm mechanism in the position shown in Figs. 3 and 4 rather than as shown in Figs. 1 and 2.

Fig. 12 is a fragmental view in partial section as seen from line 12—12 in Fig. 9.

Fig. 13 is a fragmental view in partial section as seen from line 13—13 in Fig. 10.

Fig. 14 is a fragmental view in partial section as seen from line 14—14 in Fig. 12.

Fig. 15 is a view similar to Fig. 7 but with the wheel arm mechanism in the position shown in Figs. 3 and 4 rather than as shown in Figs. 1 and 2.

Like reference numbers refer to like parts in the several figures of the drawings.

Referring now to Figures 1 to 4 of the drawings there is seen a golf cart having a tubular frame 20 having a curved lower end to which is attached a ground contacting base 21 forming a support on said frame for the lower end of a golf club bag, not shown. A steering and propelling handle 22 is seen to be pivotally attached to the top of frame 20 and near the top of frame 20 these is attached an upper support 23 for the upper end of the golf bag referred to above. Wheels 24 rotatably attached to axles 25 are provided for supporting and transporting the golf cart. Parts 20, 21, 22, 23, 24 and 25 are generically old in the art and no part of this invention except as combined with the novel and useful means for positionably attaching wheel axles 25 to frame 20 as will now be explained.

It is first to be noted that in Figs. 1 and 2 with wheels 24 in the positions shown with respect to frame 20, base 21 with the two wheels 24 forms a tripod stationary support for the cart with the club bag, not shown, in an upright position which is the storage arrangement most economical of space. Also by tipping the cart only slightly backward the cart will be entirely supported on wheels 24 for moving into and out of the storage space. In Figs. 3 and 4 with wheels 24 in the positions shown with respect to frame 20, base 21 with the two wheels 24 again forms a tripod stationary support for the cart with the club bag, not shown, but in this case the tripod has a much longer sided base to give stability to the cart on the more uneven golf playing grounds. Also with the greater spacing of wheels 24 the cart may be tipped rearwardly to be entirely supported on its wheels for transporting the bag of clubs as desired over the playing grounds.

It is seen that the wheel position arrangement of Figs. 1 and 2 and the wheel position arrangement of Figs. 3 and 4 are both required of a satisfactory golf cart and that in either of the positions the axles 25 must be coaxial for proper wheel operation. To provide mechanism for positioning wheel axles 25 as above required is a principal object of this invention.

In a cart of the present type a longitudinal vertical plane including the centerline of frame 20 would divide the cart into two sides of which the parts of one would be a mirror image of the parts of the other. It is seen that wheel axles 25 are each supported on a separate wheel arm mechanism, 26 or 27, one of which being a mirror image of the other as above noted. The upper ends of each of the mechanisms 26 or 27 include a respective end of horizontal bracket 28 secured to frame 20 by cap 29 and screws 30 as seen in Figs. 3, 4 and 7. For purposes of complete disclosure only mechanism 27 will be described.

Wheel arm mechanism 27 is essentially a parallelogram system of which one of the required two long links having equal effective lengths is the stiff arm casting 31. Casting 31 includes at its upper end an enlarged cylindrical upper end head 32 adapted rotatably to journal therein, about a center 36, the mating end of bracket 28. Head 32 of link arm 31 is secured horizontally on bracket 28 between flange 33 formed on bracket 28 and disk 34 secured to the end of bracket 28 by screws 35.

Casting 31 includes at its lower end an enlarged cylindrical lower end head 37. The inner end of lower head 37 is closed by disk 38 formed as a part thereof. Rotatably secured into lower head 37 from its open end by headed bolt 39 threaded into disk 38 and secured by lock nut 40 is support 41 for wheel axle 25.

Axle support 41 is formed with a relatively thick disklike back 43 with a smaller diameter coaxial cylindrical boss 42 extending from one side thereof. Also extending from the same side of back 43 of support 41 is an arcuate boss 44 radially spaced from boss 42 to receive therebetween coil spring 45 the radial end of which for assembly purposes is hooked over circumferential extension 46 of boss 44. See Fig. 10. The other end of boss 44 is formed with an axially extending flat surface 47 substantially tangential to spring 45. Also extending from the same side of back 43 of support 41 is boss 44a having surface 48 against which the tangential end of spring 45 is strained and having hipped surface 49 the hip edge of which is the lower end pivot edge for rod shaped link 50 which with stiff arm casting 31 forms the two long links having equal effective lengths as required for the motion parallelogram here disclosed.

As shown in Figs. 12, 13 and 14 the lower cup end 37 of arm 31 has inwardly depending from its cylindrical wall a longitudinally extending radial boss 51 which, when axle support 41 with spring 45 is assembled into cup end 37, enters under the radial end of spring 45 (see Fig. 10), in the notch formed by extension 46 in boss 44 and thereafter moves the radial end of spring 45 toward its tangential end whenever stiff arm 31 is moved counterclockwise with respect to axle support 41 as seen in Figs. 10 and 11.

As above noted the enlarged upper head 32 of stiff arm 31 is rotatably carried on bracket 28, the cylindrical outer surface 52 (see Figs. 5 to 8 and 15) of which is longitudinally interrupted by a deep radial notch 53 intersecting an off-center notch 54 sunk transversely into the end of bracket 28. A latch 55 having a knob 56 and adapted to be positioned in notch 53, as shown, is formed with oppositely extending alined transverse cylindrical bosses 57 forming journals, as shown, to cooperate with bearing notch 54 rotatably to secure latch 55 in notch 53. Spring 58 as shown in Fig. 8 is seen to be guided in a hole sunk upwardly into the under side of latch 55 and confined between latch 55 and the bottom surface of notch 53 to bias latch 55 outwardly of 53 so that as arm 27 is rotated from its position shown in Figs. 2 and 7 to its position shown in Figs. 4 and 15, latch 55 pressed by spring 58 against the inner cylindrical surface of head 32 will move outwardly into notch 59, formed radially outwardly in the inner cylindrical surface of head 32, and will latch arm 27 securely in the position shown in Figs. 4 and 15.

Referring again to Figs. 7 and 15 it is seen that bearing notch 54 sunk transversely into the end of bracket 28 is expanded at its left end to receive the upper end of link rod 50 which abuts, as shown, the hip edge of hipped surface 60 of bracket 28 which forms the upper end pivot edge for rod 50. Rod 50 is seen in Figs. 10 and 11 to be biased upwardly by spring 45 strained between boss 51 of end 37 of arm 31 and surface 48 of boss 44a of support 41 with the hip edge of the hip surface 49 of boss 44a abutting the lower end of rod 50.

It is seen that a parallelogram of motion is formed of means forming two long links of equal effective lengths pivoted on and spaced by two short links of equal effective lengths. The long links are stiff arm 31 and rod 50 and the short links are the end of bracket 28 and axle support 41. The four spaced pivot points of the parallelogram of motion are: at the upper end of mechanism 27, the hip edge of surface 60 in the end of bracket 28 and the center of rotation 36 of head 32 of arm 31 about the journal end of bracket 28; and at the lower end of mechanism 27, the hip of surface 49 and the center of rotation 39 of head 37 of arm 31 about axle support 41. The link axes or straight lines between the four pivot points above noted form the said parallelogram of motion.

It is seen that V shaped arm 31 has an upper cylindrical head 32 and a lower cylindrical head 37. Also it is seen in Figs. 6 to 15 that rod or link 50 extends along the inner side of the V of arm 31 with the respective ends of link 50 extending into heads 32 and 37 through notches formed in their respective cylindrical walls. As seen in Figs. 9 to 13, when support 41 for wheel axle 25 is rotatably secured into lower head 37 of arm 31 by bolt 39 the lower end of link 50 is secured in arm 31 for longitudinal movement only. As seen in Figs. 6 to 8, when head 32 of arm 31 is rotatably secured to one end of bracket 28 by disk 34 and screws 35, the upper end of link 50 is secured in arm 31 for longitudinal movement only. It is seen in Fig. 6 that link 50 lays along the inner surface of arm 31 with its axis parallel to the straight line between the turning axes of upper head 32 and lower head 37 of arm 31.

Noting particularly Figs. 1 to 5, it is seen that the journal axes of the ends of bracket 28 (as noted at 36 in Fig. 7) are in the same plane which is substantially perpendicular to frame 20. Then as seen in Fig. 5, the axes 36 of arm mechanisms 26 and 27 respectively are set at a desired angle to each other to give the wheels 24 a sufficient spread for working stability when the mechanisms 26 and 27 are rotated about the axes 36 to move wheels 24 from the positions shown in Figs. 1 and 2 to the positions shown in Figs. 3 and 4.

Assuming the cart is in the position shown in Figs. 1 and 2 it is seen that to move the cart it is only necessary to tip the cart backwards to raise base 21 from the ground and the cart can be rolled anywhere on its wheels 24. However, if the cart is to be moved over an uneven surface as in the play of golf, it is best first to tip the cart forward to raise wheels 24 off the ground and then to rotate arm mechanisms 26 and 27 one at a time upwardly and rearwardly against the bias of springs 45 respectively until the mechanisms 26 and 27 are locked in their positions shown in Figs. 3 and 4 by the entrance of the respective latches 55 into their respective notches 59.

In doing the last mentioned movement of either arm mechanisms 26 or 27 it is seen that the arm mechanisms each start from the positions shown in Figs. 1, 2 and 5 to 10, 12 and 13 and move to their positions shown in Figs. 3, 4, 15 and 11. Referring to Figs. 7 and 10, it is seen that arm 31 is substantially vertical and rod link 50 is substantially vertical but as stiff arm 31 is moved upwardly and rearwardly taking with it rod link 50, the straight line (link axis) of arm 31 between journal axis 36 of upper head 32 and axis 39 of lower head 37 remains parallel to rod link 50 and both become more nearly perpendicular to the straight line (link axis) between journal axis 36 and the hip edge of hip surface 60 of the end of bracket 28. With the resultant longitudinal movement of rod link 50 with respect to arm link 31 from the position shown in Fig. 7 to the position shown in Fig. 15, it is plain that the relation of the wheel end of rod link 50 with respect to arm link 31 will change from the position shown in Fig. 10 to the position shown in Fig. 11. That is to say, that as arm 31 rotates about fixed axis 36 and rod 50 pivots on hip surface 60, rod 50 with its lower end pivoted on hip surface 49 requires that support 41 of axle 25 rotate within lower head 37 of arm 31 to keep the straight line (link axis) between axis 39 and the hip edge of hip surface 49 parallel to the stationary upper short link axis between journal axis 36 and the hip edge of hip surface 60. And since parallel wheel axles 25 have the same angles to their supporting heads 41 that the transverse axis of bracket 28 has to its journal axes 36 it is apparent that throughout any manipulation of mechanisms 26 or 27 wheel axles 25 will remain parallel and perpendicular to a fore and aft vertical center plane including the axis of frame 20.

Having thus recited some of the objects of my invention, illustrated and described a form in which my invention may be practiced and explained its operation, I claim:

1. A mechanism for parallel motion comprising a stationary support having a first axis and a movable support having a second axis parallel to and spaced from said first axis, together with a first means for supporting said movable support on said stationary support for translation of said movable support with respect to said first axis and a second means for preventing the rotation of said movable support with respect to said second axis; said first means comprising a stiff arm formed at its one end with a third means for cooperating with said stationary support to support said stiff arm at said one end on said stationary support rotatably about said first axis and formed at its other end with a fourth means for cooperating with said movable support to support said stiff arm at said other end on said movable support rotatably about its said second axis; said stiff arm having a longitudinal axis in the plane of said first and second axes; and said second means including a strut slidably supported on said stiff arm for longitudinal movement parallel to the longitudinal axis of said stiff arm, said strut being formed equal in length to the length between said first and second axes of said axis of said stiff arm; abutment means on said stationary support for cooperating with one end of said strut to oppose the longitudinal movement of said strut towards said stationary support, and abutment means on said movable support for cooperating with the other end of said strut to oppose the longitudinal movement of said strut towards said movable support thereby to cause one end of said stiff arm to rotate equally and oppositely about said second axis as the other end of said stiff arm is rotated about said first axis and thereby to cause said movable support to move only parallel to itself.

2. The mechanism of claim 1 including biasing means for biasing said movable support in the direction of rotation about its axis to bias its abutment means toward its mating abutment means on said strut to maintain said strut in compression.

3. The mechanism of claim 2 in which the axis of longitudinal motion of said strut is laterally fixedly spaced from a plane including said first and second parallel axes.

4. The mechanism of claim 1 including means for latching said stiff arm in one of its positions of rotation about one of said supports.

5. The mechanism of claim 4 including a wheel axle rigidly secured to said movable support.

6. A golf cart including a frame, a wheel support and a parallel motion mechanism for translating said wheel support from one position to another position, said mechanism including a first arm link rotatively secured at its ends respectively to said frame and said wheel support for rotation of said first link about its said respective ends in either direction about respective first and second parallel axes, a second arm link carried on said first arm link for longitudinal motion with respect thereto, said frame forming a third link including a first abutment means for limiting the longitudinal movement of said second link in one direction, said wheel support forming a fourth link including a second abutment means for limiting the longitudinal movement of said second link in the other direction and biasing means carried on said first arm link to urge said second abutment means toward said second link to confine said second link in compression between said first and second abutments to cause one end of said first arm link to rotate about said wheel support and said second parallel axis equally and oppositely to the rotation of the other end of said first arm link about said first parallel axis as said wheel support is moved to said other position, said mechanism including means for latching one end of said first arm link in a desired position of rotation about one of said parallel axes.

7. In combination a stationary support, a movable support and a parallel motion mechanism for translating said movable support from one position to another position, said mechanism including a first arm link rotatively secured at its respective ends to said respective stationary and movable supports for rotation in either direction respectively about first and second parallel axes, a second arm link carried on said first arm link for longitudinal motion with respect thereto, said stationary support forming a third link including a first abutment means for limiting the longitudinal movement of said second link in one direction, said movable support forming a fourth link including a second abutment means for limiting the longitudinal movement of said second link in the other direction and biasing means carried on said first arm link to urge said second abutment means toward said second arm link to confine said second arm link in longitudinal compression between said first and second abutments to cause one end of said first arm link to rotate about said movable support and said second parallel axis equally and oppositely to the rotation of the other end of said first arm link about said first parallel axis as said wheel support is moved to said other position.

8. The combination of claim 7 including latching means cooperatively included on said stationary support and said first arm link to latch said first arm link in a desired position with respect to said stationary support.

References Cited in the file of this patent
UNITED STATES PATENTS

| | | |
|---|---|---|
| 2,574,232 | Welsh | Nov. 6, 1951 |
| 2,626,815 | Chamberlin | Jan. 27, 1953 |
| 2,679,402 | Sawyer | May 25, 1954 |
| 2,782,048 | Williams | Feb. 19, 1957 |